United States Patent [19]

Kuehl

[11] Patent Number: 4,661,467
[45] Date of Patent: Apr. 28, 1987

[54] PREPARATION OF CATALYST COMPOSITION COMPRISING A BORON CONTAINING CRYSTALLINE MATERIAL HAVING THE STRUCTURE OF ZEOLITES ZSM-5, ZSM-11, ZSM-12, BETA OR NU-1

[75] Inventor: Guenter H. Kuehl, Cherry Hill, N.J.

[73] Assignee: Mobil Oil Corporation, New York, N.Y.

[21] Appl. No.: 819,783

[22] Filed: Jan. 17, 1986

Related U.S. Application Data

[63] Continuation-in-part of Ser. No. 791,656, Oct. 10, 1985, abandoned, which is a continuation-in-part of Ser. No. 709,366, Mar. 11, 1985, abandoned, which is a continuation of Ser. No. 591,091, Mar. 19, 1984, abandoned, which is a continuation-in-part of Ser. No. 425,021, Sep. 27, 1982, abandoned.

[51] Int. Cl.[4] ............................................. B01J 21/02
[52] U.S. Cl. .................................... 502/202; 423/277; 423/326; 423/328; 423/329; 502/60; 502/63; 502/77; 502/79

[58] Field of Search ............... 423/277, 326, 328, 329, 423/328 M, 328 T, 328 C, 329 T; 502/77, 60, 202

[56] References Cited

U.S. PATENT DOCUMENTS

| Re. 28,341 | 2/1975 | Wadlinger et al. | 208/120 |
|---|---|---|---|
| Re. 29,948 | 3/1979 | Dwyer et al. | 208/110 |
| 3,308,069 | 3/1967 | Wadlinger et al. | 252/455 |
| 3,702,886 | 11/1972 | Argauer et al. | 423/328 |
| 3,709,979 | 1/1973 | Chu | 423/328 |
| 3,832,449 | 8/1974 | Rosinski | 423/328 |
| 4,060,590 | 11/1977 | Whittam et al. | 423/328 |
| 4,268,420 | 5/1981 | Klotz | 252/432 |
| 4,269,813 | 5/1981 | Klotz | 423/277 |
| 4,495,303 | 1/1985 | Kuehl | 502/62 |

Primary Examiner—John Doll
Assistant Examiner—Jackson Leeds
Attorney, Agent, or Firm—Alexander J. McKillop; Michael G. Gilman; Dennis P. Santini

[57] ABSTRACT

This invention relates to a method for preparing a catalyst composition comprising a synthetic boron-containing crystalline material having the structure of zeolite ZSM-5, ZSM-11, ZSM-12, Beta or Nu-1.

25 Claims, No Drawings

PREPARATION OF CATALYST COMPOSITION COMPRISING A BORON CONTAINING CRYSTALLINE MATERIAL HAVING THE STRUCTURE OF ZEOLITES ZSM-5, ZSM-11, ZSM-12, BETA OR NU-1

BACKGROUND OF THE INVENTION

This is a continuation-in-part of application Ser. No. 791,656 filed Oct. 28, 1985, now abandoned, which in turn is a continuation-in-part of application Ser. No. 709,366 filed Mar. 11, 1985, now abandoned, which in turn is a continuation of application Ser. No. 591,091 filed Mar. 19, 1984, now abandoned, which in turn is a continuation-in-part of application Ser. No. 425,021 filed Sept. 27, 1982, now abandoned.

1. Field of the Invention

A new and useful improvement in a method for preparing a catalyst composition comprising a synthetic boron-containing crystalline material having the structure of zeolite ZSM-5 and other borosilicate zeolites including those of ZSM-11, ZSM-12, Beta and Nu-1 structure is provided. The method comprises synthesizing said catalyst by a series of steps which insure minimization of hydrolysis of the boron entity away from the boron-containing crystalline material structure comprised therein. Not only is synthesis of such a catalyst facilitated by the present method, but the final catalyst product exhibits unusually useful properties, including the shape-selectivity of zeolite, reduced loss of boron from processing and utility in the processing of high nitrogen-containing oils such as, for example, shale oils.

2. Description of the Prior Art

Zeolite ZSM-5 and its preparation are taught in U.S. Pat. Nos. 3,702,886 and Re. 29,948, the contents of each being entirely incorporated herein by reference. Zeolite ZSM-11, ZSM-12, Beta and Nu-1 and their preparation are taught in U.S. Pat. Nos. 3,709,979; 3,832,449; 3,308,069; Re. 28,341; and 4,060,590, respectively, all hereby incorporated by reference. A boron-containing crystalline material having the structure of zeolite ZSM-5 is disclosed in U.S. Pat. Nos. 4,268,420 and 4,269,813. The method of crystalline material synthesis taught in the latter patents allows for substantial removal of boron from the crystal structure by way of hydrolysis when a catalyst comprising same is formulated.

Applicant knows of no prior art methods for preparation of a catalyst composition comprising a boron-containing crystalline material having the structure of the noted zeolite utilizing the present invention.

SUMMARY OF THE INVENTION

A method for preparing an improved catalyst composition comprising a boron-containing crystalline material having the structure of zeolite ZSM-5 and other borosilicate zeolites, including those of ZSM-11, ZSM-12, Beta and Nu-1 structure exhibiting enhanced utility when compared with other catalyst materials is provided. The method comprises the critical sequential steps of synthesizing a boron-containing crystalline material having the noted zeolite structures; drying the crystalline material at a temperature of from ambient to less than about 170° C.; calcining the dried crystalline material in an oxygen- and water-free (water-free) environment or atmosphere at a temperature of from about 200° to about 600° C.; contacting the calcined crystalline material with an ion-exchange solution at a pH of from about 7 to about 11; compositing the ion-exchange solution contacted crystalline material with an inorganic oxide binder material; drying the composite at a temperature of from ambient to less than about 170° C. and then calcining the dried composite at a temperature of from about 200° to about 600° C.

This invention relates to a method for preparing a catalyst composition for processing high nitrogen-containing oils comprising a boron-containing crystalline material having the structure of zeolite ZSM-5, ZSM-11, ZSM-12, Beta or Nu-1, which comprises the sequential steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment of anhydrous ammonia, anhydrous nitrogen, other anhydrous inert gases, or a mixture thereof, at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

The invention also relates to a method for preparing a catalyst composition comprising a boron-containing crystalline material having the structure of zeolite ZSM-5, ZSM-11, ZSM-12, Beta or Nu-1, which comprises the steps of (1) synthesizing a boron-containing crystalline material having the structure of zeolite ZSM-5, ZSM-11, ZSM-12, Beta or Nu-1; (2) drying said crystalline material at a temperature of from about ambient to less than about 170° C.; (3) calcining said dried crystalline material at a temperature of from about 200° to about 600° C. and adsorbing ammonia on said calcined crystalline material; (4) contacting said crystalline material with an ion-exchange solution at a pH of from above 7 to about 11; (5) compositing said ion-exchange solution contacted crystalline material with an inorganic oxide material; (6) drying said composite at a temperature of from about ambient to less than about 170° C.; and (7) calcining said dried composite at a temperature of from about 200° to about 600° C., the improvement which comprises conducting said steps in sequential order, and maintaining said calcining step (3) in an oxygen-free and water-free environment of anhydrous ammonia, anhydrous nitrogen or a mixture thereof to minimize hydrolysis of boron in the boron-containing material.

This invention also relates to a method for preparing a catalyst composition for processing high nitrogen-containing oils comprising a boron-containing crystalline material having the structure of zeolite ZSM-12, which comprises the sequential steps of synthesizing a boron-containing crystalline material having the structure of zeolite ZSM-12; drying said crystalline material at a temperature of from about ambient to less than about 170° C.; calcining said dried crystalline material in an oxygen- and water-free environment of anhydrous ammonia, anhydrous nitrogen, other anhydrous inert gases, or a mixture thereof, at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

This invention also relates to a method for preparing a catalyst composition for processing high nitrogen-containing oils comprising a boron-containing crystalline material having the structure of zeolite ZSM-12, which comprises the steps of (1) synthesizing a boron-containing crystalline material having the structure of zeolite ZSM-12; (2) drying said crystalline material at a temperature of from about ambient to less than about 170° C.; (3) calcining said dried crystalline material at a temperature of from 200° to about 600° C. and adsorbing ammonia on said calcined crystalline material; (4) contacting said crystalline material with an ion-exchange solution at a pH of from above about 7 to about 11; (5) compositing said ion-exchange solution contacted crystalline material with an inorganic oxide material; (6) drying said composite at a temperature of from about ambient to less than about 170° C.; and (7) calcining said dried composite at a temperature of from about 200° to about 600° C., the improvement which comprises conducting said steps in sequential order, and maintaining said calcining step (3) in an oxygen- and water-free environment of anydrous ammonia, anhydrous nitrogen, other anhydrous inert gases, or a mixture thereof, to minimize hydrolysis of boron in the boron-containing crystalline material.

This invention also relates to a method for preparing a catalyst composition for processing shale oil consisting essentially of a boron-containing crystalline material having the structure of zeolite ZSM-5, said structure defined in U.S. Pat. No. 3,702,886, which comprises the sequential steps of synthesizing a boron-containing crystalline material having the structure of zeolite ZSM-5; drying said crystalline material at a temperature of from about ambient to less than about 170° C.; calcining said dried crystalline material in an oxygen- and water-free environment of anhydrous nitrogen at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

This invention also relates to a catalyst composition prepared by the method comprising the steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment at a temperature of from about 200° to about 600° C.; adsorbing ammonia on said calcined crystalline material; contacting said crystalline material with an ion-exchange solution at a pH of from about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

This invention also relates to a method for preparing a catalyst composition for processing high nitrogen-containing oils comprising a boron-containing crystalline material having the structure of zeolite ZSM-5, ZSM-11, ZSM-12, Beta or Nu-1, which comprises the sequential steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment of anhydrous ammonia, anhydrous nitrogen, other anhydrous inert gases or a mixture thereof at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; drying said ion-exchanged solution at a temperature of from about ambient to less than about 170° C. and calcining said dried ion-exchanged solution at a temperature of from about 200° to about 600° C.

This invention also relates to a catalyst composition prepared by the method comprising the steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment at a temperature of from about 200° to about 600° C. to minimize hydrolysis of boron in the boron-containing crystalline material; adsorbing ammonia on said calcined crystalline material; contacting said crystalline material with an ion-exchange solution at a pH of from about 7 to about 11; drying said ion-exchanged solution at a temperature of from about ambient to less than about 170° C. and calcining said dried ion-exchanged solution at a temperature of from about 200° to about 600° C.

EMBODIMENTS

This is continuation-in-part of application Ser. No. 791,656 filed Oct. 28, 1985, which in turn is a continuation-in-part of application Ser. No. 709,366 filed Mar. 11, 1985, which in turn is a continuation of application Ser. No. 591,091 filed Mar. 19, 1984, which in turn is a continuation-in-part of application Ser. No. 425,021 filed Sept. 27, 1982, the entire contents of which are incorporated herein by reference.

The first step of a critical sequence of steps of the present method involves synthesis of a boron-containing crystalline material having the structure of zeolite ZSM-5 and other borosilicate zeolites, including those of ZSM-11, ZSM-12, Beta and Nu-1 structure. This step comprises forming a reaction mixture containing a source of organic nitrogen-containing cations, such as, for example, primary amines containing from 2 to about 10 carbon atoms, or ammonium compounds, such as tetraalkylammonium compounds, in which the alkyl contains from 2 to 5 carbon atoms, sodium oxide, an oxide of silicon, water and a source of boron and, optionally, an oxide of aluminum, and having a composition, in terms of mole ratios of oxides, falling within the following ranges:

|  | Board | Preferred | Most Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $SiO_2/Al_2O_3$ | 500–Infinity | 750–30,000 | 1,000–10,000 |
| $SiO_2/B_2O_3$ | 4–300 | 6–200 | 8–100 | wherein R is an organic moiety in a nitrogen-containing cation.

Reaction conditions consist of heating the foregoing reaction mixture to a temperature of from about 90° to about 200° C. for a period of time of from about 6 hours to about 120 days. A more preferred temperature range is from about 100° to about 200° C., with the amount of time at a temperature in such range being from about 12 hours to about 10 days.

The digestion of the gel particles is carried out until crystals form. The crystalline product is separated from the reaction medium, as by cooling the whole to room temperature, filtering and water-washing at conditions including elevated pH, e.g., with 0.01N NaOH or 0.01N $Na_2CO_3$ solution, insuring limited, if any, removal of boron from the crystalline structure.

The second step of the present method involves drying the crystalline material at a temperature of from about ambient to less than about 170° C., usually from about 65° to less than about 170° C., for a time of from about 8 to about 24 hours and a pressure, preferably atmospheric, sufficient to effectively substantially remove any water present.

The anhydrous composition of the boron-containing crystalline material having the noted zeolite structures in the "as crystallized" form can be identified, in terms of mole ratios of oxides, as follows:

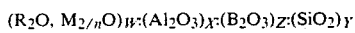

$$(R_2O, M_{2/n}O)_W:(Al_2O_3)_X:(B_2O_3)_Z:(SiO_2)_Y$$

wherein W(X+Z) is from greater than about 0.5 to less than about 3; (X+Z) is greater than about 20; Z/(X+Z) is from about 0.6 to about 1.0; R is a nitrogen-containing cation, which may include primary amines containing 2 to 10 carbon atoms and ammonium cations, preferably the tetraalkyl-ammonium cation in which the alkyl contains from 2 to 5 carbon atoms; M is a metal from Group IA of the Periodic Table of the Elements, ammonium, hydrogen or mixtures thereof; and n is the valence of M.

The third step of the present method involves calcining the dried boron-containing crystalline material from the first step in an oxygen- and water-free environment, such as, for example, a flowing stream of anhydrous ammonia, anhydrous nitrogen, other anhydrous inert gases, or a mixture thereof, at a temperature of from about 200° to about 600° C. and for a time of from about 10 minutes to about 48 hours. Presence of oxygen can cause water formation. The calcination of this third step may be conducted at atmospheric pressure, with subatmospheric or superatmospheric pressures also useful within the temperature and time limitations above given. After or upon cooling, ammonia is adsorbed.

The fourth step involves contacting the calcined crystalline material with an ion-exchange solution at a controlled pH of from about 7 to about 11, preferably from about 9 to about 11. The exchange solution will be a 0.01 to 5 Normal, preferably 0.05 to 5 Normal, aqueous solution of a material selected from the group consisting of ammonium salts, ammonium hydroxide, metal salts and mixtures thereof. This step accounts for replacement of original alkali metal of the boron-containing crystalline material with metal ions, ammonium ions, hydrogen ions or mixtures thereof. The metal ions include those derived from metals of Group I through VIII of the Periodic Table, such as, for example, Group IB (e.g., Cu and Ag), Group IIA (e.g., Ca), and Group VIII (e.g., Fe, Co, Ni, Ru, Rh, Pd, Ir and Pt). An ammonium-exchange solution is preferred, with the ions provided by a material selected from the group consisting of ammonium nitrate, ammonium sulfate, ammonium chloride and the like. Following contact with the solution of the desired replacing cations, the crystalline material may be washed with a basic, e.g., pH above about 7, solution, such as 1N $NH_4OH$, and dried at a temperature of from about ambient to less than about 170° C., preferably from about ambient to about 150° C., in order to remove excess ions and exchange solution. The fourth step must follow the third step. This sequence of steps is critical.

Regardless of the cations replacing the alkali metal in the synthesized form of the boron-containing crystalline material, the spatial arrangement of the aluminum, boron, silicon and oxygen atoms which form the basic crystal lattices of the crystal remains essentially unchanged, as determined by taking an X-ray powder diffraction pattern of the ion-exchanged material. Such X-ray diffraction pattern of the ion-exchanged product reveals a pattern substantially the same as that for zeolite ZSM-5.

The fifth step involves compositing the boron-containing crystalline material with an inorganic oxide binder or matrix material. This step may optionally be performed prior to calcination, ammonia adsorption, and ion-exchange of steps three and four. Such materials include active and inactive materials and synthetic or naturally occurring zeolites, as well as materials such as clays, silica and/or metal oxides. If the final catalyst product of the present method is to be used in a process for treating high nitrogen-containing oils, such as, for example, shale oils, the formation of acid sites in or on the binder is desirably avoided, so the binder or matrix material, in that instance, should not be silica-alumina. The materials may be either naturally occurring or in the form of gelatinous precipitates or gels including mixtures of silica and metal oxides. Inactive materials suitably serve as diluents to control the amount of conversion in a given process so that products can be obtained economically and in orderly manner without employing other means for controlling the rate of reaction.

Naturally occurring clays which can be composited with the boron-containing crystalline material include the montmorillonite and kaolin families which include the sub-bentonites and the kaolins commonly known as Dixie, McNamee, Georgia and Florida clays, or others in which the main mineral constituent is halloysite, kaolinite, dickite, nacrite or anauxite. Such clays can be used in the raw state as originally mined, or they can be initially subjected to calcination, acid treatment or chemical modification.

In addition to the foregoing materials, the boron-containing crystalline material can be composited with a porous material, such as silica, alumina, silica-alumina (with the proviso indicated above for catalyst to be used in processing high nitrogen-containing feedstocks), silica-magnesia, silica-zirconia, silica-thoria, silica-beryllia, silica-titania, as well as ternary compositions, such as silica-alumina-thoria, silica-alumina-zirconia, silica-alumina-magnesia and silica-magnesia-zirconia. The material can be in the form of a cogel. The relative proportions of finely divided boron-containing crystalline material and inorganic oxide vary widely, with the crystalline material content ranging from about 1 to about 90% by weight and more usually, particularly when the composite is prepared in the form of beads, in the range of about 2 to about 50% by weight of the composite.

The composite of the fifth step of the present method can be shaped in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, it can be extruded before drying or dried or partially dried and then extruded.

The sixth step involves drying composite formed in the fifth step at a temperature of from about ambient to less than about 170° C., usually from about 65° to about 150° C., for a period of time of from about 8 hours to about 24 hours and pressure, preferably atmospheric, sufficient to effectively substantially remove any water component of the composite.

The seventh step involves calcining the dried composite at a temperature of from about 200° to about 600° C. for from about 10 minutes to about 48 hours. This calcination step may be conducted in an atmosphere such as air and at atmospheric pressure, with subatmospheric or superatmospheric pressure also useful within the temperature and time limitations above given.

Utility of the present catalyst composition is demonstrated when used for reducing the pour point of oil stocks containing high levels of organic (total) nitrogen, e.g., up to about 3% by weight. The present catalyst exhibits ability to shape-selectively crack normal paraffins in chargestocks containing high basic nitrogen concentrations at low or nil hydrogen consumption, with improved catalyst life due to decreased coking.

Reducing the pour point of high nitrogen-containing oil stocks by shape-selective cracking of normal paraffins is quite difficult by conventional catalytic methods due to catalyst poisoning by the basic nitrogen compounds therein contained. The present catalyst material makes it possible to effectively dewax such feedstock. Product quality and pumpability is improved and hydrotreating severity often required in processing such feedstock is decreased when the present catalyst is used. This results in lower overall hydrogen consumption and the attendant economics.

The following examples illustrate preparation and utility of the present catalyst composition.

EXAMPLE 1

The boron-containing crystalline material having a zeolite ZSM-5 structure, and the catalyst comprising same, were prepared by the method set forth below.

Boric acid, 19.2 grams, and 28.8 grams of sodium hydroxide were dissolved in 2304 grams of water. Tetrapropylammonium bromide, 362.4 grams, was added and dissolved. To the composite solution was added 439.8 grams of Ludox LS silica sol (30% $SiO_2$) with vigorous stirring. The reaction mixture was heated at 165° C. for 216 hours. The crystalline product obtained had the X-ray diffraction pattern of ZSM-5 and the crystallinity was 120%, compared with a reference sample. The crystalline product was dried at 165° C. The sorption capacities of the crystalline product were, in grams/100 grams of zeolite at 25° C:

| | |
|---|---|
| Cyclohexane, 20 mm Hg | 2.1 |
| n-Hexane, 20 mm Hg | 10.8 |
| Water, 12 mm Hg | 10.4 |

The chemical composition was:

| | Dried at 165° C. | Ignited Weight Bases |
|---|---|---|
| $SiO_2$, Wt % | 84.8 | 96.7 |
| $B_2O_3$, Wt % | 1.23 | 1.40 |
| $Al_2O_3$, ppm | 460 | 525 |
| $Na_2O$, Wt % | 1.05 | 1.20 |
| N, Wt % | 0.90 | — |
| Ash, Wt % | 87.7 | 100 |
| $SiO_2/(Al_2O_3 + B_2O_3)$, molar | 78 | |
| B/(Al + B) | 0.975 | |

The crystalline material consisted of near-spherulitic particles with a diameter in the range of 1 to 2 microns.

The above material was heated in a water-free environment, i.e., an anhydrous ammonia stream, to 600° C. and held at that temperature for 1 hour. The calcined material was then allowed to cool to ambient temperature in an anhydrous ammonia atmosphere.

The above crystalline product was then exchanged three times for 2 hours at room temperature with a solution, 0.1N $NH_4Cl$ and 1N $NH_4OH$ (5.35 grams $NH_4Cl$ + 60 grams of concentrated $NH_4OH$/liter), using 50 cc per gram of zeolite per exchange. The pH of the exchange solution was 10.4. The solid was filtered, washed chloride-free with 1N $NH_4OH$ and dried at ambient temperature. It contained 0.02% residual sodium.

The ammonium form of the boron-containing crystalline material was then mulled with alumina monohydrate in the weight ratio of 65% zeolite and 35% alumina, both based on ash. Water was added to obtain an extrudable blend. The mixture was then extruded with a 1/16-inch die, dried at 120° C. and calcined for 3 hours at 538° C. in air, to provide a catalyst material which proved to have an Alpha Value of 2.4.

As is known in the art, the Alpha Value is an approximate indication of the catalytic cracking activity of the catalyst compared to a standard catalyst, and it gives the relative rate constant (rate of normal hexane conversion per volume of catalyst per unit time). It is based on the activity of the highly active silica-alumina cracking catalyst taken as an Alpha of 1 (rate constant = 0.016). The Alpha Test is described in U.S. Pat. No. 3,354,078 and in *The Journal of Catalysis*, Vol. IV, pp. 522–529 (August 1965), each incorporated herein by reference as to that description.

EXAMPLE 2

A shale oil having first been hydrotreated in a conventional manner and having the properties listed below:

| | |
|---|---|
| Gravity, °API | 36.1 |
| Pour Point, °F. | 70 |
| Hydrogen, Wt % | 13.81 |
| Sulfur, Wt % | 0.133 |
| Nitrogen, ppm | 340 |
| Yields, Wt % | |
| 1-400° F. | 13.6 |
| 400-650° F. | 50.6 |
| 650-850° F. | 26.9 |
| 850° F. | 8.9 | was contacted in a dewaxing reactor, with the present catalyst prepared in Example 1, at a LHSV of 0.5, a pressure of 2000 psig and a hydrogen circulation rate of 5000 SCF/bbl. As the reactor temperature progressed through the range of 700° to 825° F., product pour points and yields were measured. The results were as follows:

| | Reactor Temperature, °F. | | |
|---|---|---|---|
| | 725 | 775 | 825 |
| Pour Point, °F. | +75 | +40 | −50 |
| Yields, Wt % | | | |
| $C_1$-$C_3$ | 0.09 | 1.1 | 4.2 |
| $C_4$ | 0.12 | 1.3 | 3.6 |
| $C_5$ | 0.27 | 1.5 | 3.5 |
| $C_6$-400° F. | 12.5 | 17.0 | 29.5 |
| 400-650° F. | 52.5 | 53.8 | 51.8 |
| 650-850° F. | 26.0 | 25.0 | 15.0 |
| 850° F.+ | 8.4 | 4.5 | 1.5 |
| Hydrogen Cons., SCF/bbl | −2 | −9 | 114 |

EXAMPLE 3

A shale oil having first been treated to remove heavy metals and having the properties listed below:

| | |
|---|---|
| Gravity, °API | 21.9 |
| Pour Point, °F. | 75 |
| Hydrogen, Wt % | 11.51 |
| Sulfur, Wt % | 0.59 |
| Nitrogen, Wt % | 2.02 |
| Yields, Wt % | |
| IBP-400° F. | 4 |
| 400-650° F. | 34 |
| 650° F.+ | 62 | was contacted in a dewaxing reactor with catalyst prepared in Example 1 at a pressure of 2000 psig (1900 psia hydrogen partial pressure) and a hydrogen circulation rate of 5000 SCF/bbl. Reaction particulars including product pour points and yields were measured and are shown below:

| Conditions | | | | |
|---|---|---|---|---|
| Reactor Temp., °F. | 800 | | 825 | |
| LHSV, Vo/Vc - Hr | 0.8 | 0.6 | 1.1 | 0.5 |
| Yields, Wt % | | | | |
| $C_1$-$C_3$ | 2.8 | 2.8 | 3.3 | 3.7 |
| $C_4$ | 0.7 | 0.8 | 0.8 | 1.3 |
| $C_5$ | 0.3 | 1.0 | 0.4 | 1.7 |
| $C_6$-400° F. | 15 | 17 | 26 | 93 |
| 400-650° F. | 43 | 43 | 48 | |
| 650° F.+ | 38 | 35 | 22 | |
| $H_2$ Cons., SCF/bbl | 340 | 390 | 450 | 635 |
| Pour Point, °F. | 45 | 30 | 15 | −10 |
| Data Corrected to 0.5 LHSV | | | | |
| Pour Point, °F. | — | 20 | — | −10 |
| $H_2$ Cons., SCF/bbl | — | 490 | — | 635 |

EXAMPLE 4

A quantity of the same shale oil as used in Example 3 was subjected to distillation and the high-pour 650° F.+ fraction having the following properties:

| | |
|---|---|
| Gravity, °API | 17.0 |
| Pour Point, °F. | 100 |
| Hydrogen, Wt % | 11.3 |
| Sulfur, Wt % | 0.51 |
| Nitrogen, Wt % | 2.4 | was contacted with catalyst prepared in Example 1 in a dewaxing reactor at a pressure of 2000 psig and 5000 SCF/bbl hydrogen circulation. Reaction particulars, including product yields and pour points, were measured and are shown below:

| Conditions | | | |
|---|---|---|---|
| Reactor Temp., °F. | 800 | | 825 |
| LHSV, Vo/Vc - Hr | 0.5 | 1.0 | 0.41 |
| Yields, Wt % | | | |
| $C_1$-$C_3$ | 3.1 | 7.9 | 8.0 |
| $C_4$ | 0.6 | 2.9 | 2.6 |
| $C_5$ | 0.3 | 1.5 | 1.4 |
| $C_6$-400° F. | 13 | 17 | 20 |
| 400-650° F. | 34 | 31 | 36 |
| 650° F.+ | 49 | 39 | 32 |
| $H_2$ Cons., SCF/bbl | 250 | 590 | 925 |
| Pour Point, °F. | 60 | 15 | −35 |
| Data Corrected to 0.5 LHSV | | | |
| Pour Point, °F. | 60 | — | −25 |
| $H_2$ Cons., SCF/bbl | 250 | — | 760 |

EXAMPLE 5

For comparison purposes, a quantity of the same shale oil as used in Example 3 was contacted with low acidity alumino-silicate NaZSM-5 in a dewaxing reactor at 2000 psig and 5000 SCF/bbl hydrogen circulation. The product yields and pour points obtained were measured. The following Table compares the results from this example to those obtained in Example 3:

| | Example 3 | Example 5 |
|---|---|---|
| Conditions | | |
| Reactor Temp., °F. | 800 | 803 |
| LHSV, Vo/Vc-Hr | 0.6 | 0.4 |
| Yields, Wt % | | |
| $C_1$-$C_3$ | 2.8 | 7.6 |
| $C_4$ | 0.8 | 1.6 |
| $C_5$ | 1.0 | 1.4 |
| $C_6$+ | 95.4 | 89.4 |
| $H_2$ Cons., SCF/bbl | 390 | 750 |
| Pour Point, °F. | 30 | 5 |
| Data Corrected to 0.5 LHSV | | |
| Pour Point, °F. | 20 | 23 |
| $H_2$ Cons., SCF/bbl | 490 | 570 |

The data, corrected for the space velocity difference, shows that the catalyst of the present invention consumes less hydrogen while performing as well as the zeolite used in Example 5 for pour point reduction.

EXAMPLE 6

Also for comparison purposes, the feedstock as used in Example 3, having been hydrotreated in a conventional manner, was subjected to distillation and the 650° F.+ fraction having the following properties:

| Gravity, °API | 28.4 |
|---|---|
| Pour point, °F. | 105 |
| Hydrogen, Wt % | 13.24 |
| Sulfur, Wt % | 0.25 |
| Nitrogen, Wt % | 0.02 | was contacted with a conventional HZSM-5 dewaxing catalyst at a pressure of 2000 psig and a hydrogen circulation rate of 5000 SCF/bbl. Reaction particulars, including product yields and pour point, were measured. The results are shown below:

| Conditions | | | |
|---|---|---|---|
| Temperature, °F. | 775 | 800 | 825 |
| LHSV, Vo/Vc-Hr | 0.46 | 0.50 | 0.43 |
| Yields, Wt % | | | |
| $C_1-C_3$ | 0.82 | 1.82 | 5.3 |
| $C_4$ | 0.63 | 1.59 | 5.6 |
| $C_5$ | 0.35 | 1.70 | 5.6 |
| $C_6+$ | 98.2 | 95.1 | 83.9 |
| $H_2$ Cons., SCF/bbl | 15 | 138 | 270 |
| Pour Point, °F. | 95 | 80 | 20 |

Comparison of the pour point data from this Example 6 to the data in Example 4 shows that under identical reaction conditions the catalyst of the present invention was more effective for pour point reduction. This is in spite of the 10-fold higher nitrogen concentration in the feed in Example 4. This indicates that the boron-containing crystalline material, having the structure of zeolite ZSM-5, has increased resistance to nitrogen poisoning.

Boron-containing crystalline material having the zeolite ZSM-5 structure and a catalyst comprising the same are prepared by the method set forth below.

The procedure of my invention is designed to prevent or minimize exposure of the acid form of a boron-containing zeolite to water in liquid or gaseous form. This is accomplished by a critical sequence of steps. These steps comprise: heating the material slowly, for example, 1°-10° C./min. in an inert gas stream, in particular, one devoid of oxygen and water (water-free), such as dry nitrogen to a final calcination temperature, for example, 550° C. The procedure removes any adsorbed water before the acid form of the zeolite is generated by decomposition of organic cation.

The absence of oxygen prevents spontaneous combustion of the organic cation and the associated instantaneous temperature excursion, which would cause formation of water by dehydroxylation of the hydrogen form and loss of boron from the framework. Dehydroxylation may also be suppressed by keeping an ammonia partial pressure over the hydrogen form according to:

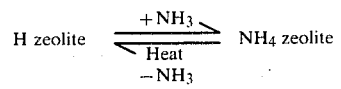

Sorbing ammonia on the calcined product prior to exposure to water, so that only the ammonium sodium form rather than the hydrogen sodium form is contacted with aqueous ion-exchange solution.

Conducting the ion-exchange at elevated pH in a range of about 7 to about 11 in order to reduce the hydrogen ion concentration in solution. Hydrogen ions would generate the hydrogen form of the zeolite which is subject to hydrolysis of boron.

Table 1 summarizes results of calcination and ion-exchange experiments and illustrates the above critical steps. The samples treated by a procedure other than that of this invention lose a considerable percentage of boron present. The amount of boron loss of the third sample is explained by the protective action of a relatively high sodium content. The column of Table 1 labeled "$B_2O_3$ Wt %" is based upon ignited weight.

TABLE 1

| | | Calcination and Ion-Exchange of Borosilicate ZSM-5 | | | | | | |
|---|---|---|---|---|---|---|---|---|
| | | | | | Exchange with | | | |
| Experiment | $SiO_2/B_2O_3$ | Calcined In | Followed By | Ammonia Sorbed | $NH_4Cl$ | $NH_4Cl/NH_4CH$ | $NH_4ac$ | $B_2O_3$ Wt % | Boron Loss % |
| 7 | 43 | | | | | | | 2.62 | |
| | | Air | — | No | X | — | — | 1.48 | 44 |
| 8 | 48 | | | | | | | 2.34 | |
| | | Air | — | No | X | — | — | 1.29 | 45 |
| 9 | 79 | | | | | | | 1.42 | |
| | | Air | — | No | X | — | — | 1.15 | 19 |
| 10 | 48 | | | | | | | 2.51 | |
| | | $N_2$ | Air | No | — | — | X | 1.86 | 14.5 |
| 11 | 32.8 | | | | | | | 3.37 | |
| | | $N_2$ | Air | No | — | — | X | 1.84 | 45 |
| 12 | 44.8 | | | | | | | 1.89 | |
| | | $N_2$ | Air | No | — | — | X | 1.20 | 36.5 |
| 13 | 63.1 | | | | | | | 1.76 | |
| | | $N_2$ | Air | No | — | — | X | 1.37 | 22 |
| 14 | 80.3 | | | | | | | 1.40 | |
| | | $NH_3$ | — | Yes | — | X | — | 1.37 | 2.1 |
| 15 | 31.4 | | | | | | | 3.38 | |
| | | $NH_3$ | — | Yes | — | — | X | 3.28 | 3.0 |
| 16 | 80.3 | | | | | | | 1.40 | |
| | | $N_2$ | — | Yes | — | X | — | 1.33 | 5.0 |

Examples 7-9 are calcined in air, causing a temperature excursion and formation of water when the organic cation is oxidized.

After cooling, the calcined sample is immediately contacted with unbuffered ammonium chloride solution (pH 5-5.5), without prior sorption of ammonia. This treatment resulted in massive hydrolysis of boron. The competing ion-exchange with ammonium prevents even greater loss of boron.

Examples 10–13 are calcined in anhydrous nitrogen. Any water present in the zeolite is removed during the heat-up period before the decomposition of the organic cations begins to occur. When the decomposition is complete, small amounts of carbon deposit on the zeolite and are burnt off by replacing the nitrogen with dry air. This step is not necessary for the ion-exchange to succeed, and is carried out merely for aesthetic reasons to give the zeolite a pure white color. The acid sites formed are not neutralized with ammonia gas prior to contact with the aqueous ion-exchange solution, which had a pH in the range of 6.5 to 7.0. Massive hydrolysis of boron is again observed.

Examples 14 and 15 of the Table are calcined in an ammonia stream. A mixed nitrogen/ammonia stream would have been satisfactory as well. The samples are cooled to room temperatures in flowing ammonia, resulting in neutralization of the hydrogen sites and additional physical sorption of ammonia on the zeolite. Example 14 is then contacted with an ion-exchange solution containing 0.1N $NH_4Cl$ and 1N $NH_4OH$ (pH 10.4). This procedure causes very little loss of boron. Example 14 is repeated as Example 16, except that ammonium calcination is replaced by nitrogen calcination with the results shown in Table 1.

The same type of calcination, followed by neutralization with ammonia and ammonia sorption, gave a similar result when exchanged with ammonium acetate (Example 15). The adsorbed ammonia, of course, raised the pH of the ion-exchange solution.

EXAMPLE 17

The same procedure used for Examples 14 and 15 is used for calcining a ZSM-12 sample (Example 17), except that the deposited carbon is burnt off in air, as in Examples 10–13 of the Table. After cooling to room temperature, ammonia is sorbed prior to contact with an exchange solution having a concentration of 0.2N NaCl and 0.02N NaOH. The sample is then washed with 0.01N NaOH (0.4 g NaOH/liter). The results are as follows:

|  | $B_2O_3$, Wt % (ignited wt. basis) |
|---|---|
| As crystallized | 1.96 |
| After calcination and ion-exchange | 1.83 |

The loss of boron is only 6.6%, demonstrating that nitrogen calcination is acceptable if followed by ammonia sorption and ion-exchange at high pH.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A method for preparing a catalyst composition for processing high nitrogen-containing oils comprising a boron-containing crystalline material having the structure of zeolite ZSM-5, ZSM-11, ZSM-12, Beta or Nu-1, which comprises the sequential steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment of anhydrous ammonia, anhydrous nitrogen, other anhydrous inert gases or a mixture thereof at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

2. The method of claim 1, wherein the boron-containing crystalline material synthesis step comprises forming a reaction mixture having a composition, in terms of mole ratios, falling within the following ranges:

| $OH^-/SiO_2$ | 0.07–1.0 |
|---|---|
| $R_4N^+/(R_4N^+ + Na^+)$ | 0.2–0.95 |
| $H_2O/OH^-$ | 10–300 |
| $SiO_2/Al_2O_3$ | 500–∞ |
| $SiO_2/B_2O_3$ | 4–300 | wherein R is selected from hydrogen and at least one organic aliphatic moiety selected from the group consisting of those containing from 2 to 10 carbon atoms, and heating said reaction mixture to a temperature of from about 90° to about 200° C. for a period of time of from about 6 hours to about 120 days.

3. The method of claim 1, wherein said boron-containing crystalline material has a composition as crystallized in terms of mole ratios of oxides on a anydrous basis as follows:

$(R_2O, M_{2/n}O)_W:(Al_2O_3)_X:(B_2O_3)_Z:(SiO_2)_Y$ wherein $W/(X+Z)$ is from greater than about 0.5 to less than about 3; $Y/(X+Z)$ is greater than about 20; $Z/(X+Z)$ is from about 0.6 to about 1.0; R is a nitrogen-containing cation provided by a primary amine containing from 2 to 10 carbon atoms or a tetraalkylammonium compound in which alkyl contains from 2 to 5 carbon atoms; M is a metal from Group IA of the Periodic Table of the Elements, ammonium, hydrogen, or mixtures thereof, and n is the valence of M.

4. The method of claim 1, wherein said pH in said ion-exchange solution contacting step is from about 9 to about 11.

5. The method of claim 1, wherein said inorganic oxide of said compositing step is alumina.

6. The method of claim 2, wherein $R_4N^+$ is a cation of a tetraalkylammonium compound in which alkyl contains from 2 to 5 carbon atoms.

7. The method of claim 6, wherein $R_4N^+$ is a cation of a tetrapropylammonium compound.

8. In a method for preparing a catalyst composition comprising a boron-containing crystalline material having the structure of zeolite ZSM-5, ZSM-11, ZSM-12, Beta or Nu-1, which comprises the steps of (1) synthesizing a boron-containing crystalline material having the structure of zeolite ZSM-5, ZSM-11, ZSM-12, Beta or Nu-1; (2) drying said crystalline material at a temperature of from about ambient to less than about 170° C.; (3) calcining said dried crystalline material at a temperature of from about 200° to about 600° C. and adsorbing ammonia on said calcined crystalline material; (4) contacting said crystalline material with an ion-exchange solution at a pH of from about 7 to about 11; (5) compositing said ion-exchange solution contacted crystalline material with an inorganic oxide material; (6) drying said composite at a temperature of from about ambient to less than about 170° C.; and (7) calcining said dried composite at a temperature of from about 200° to about 600° C., the improvement which comprises conducting said steps in sequential order, and maintaining said calcining step (3) in an oxygen-free and water-free environment of anhydrous ammonia, anhydrous nitrogen, other anhydrous inert gases, or a mixture thereof, to minimize hydrolysis of boron in the boron-containing material.

9. The method of claim 8, wherein the boron-containing crystalline material synthesis step (1) comprises forming a reaction mixture having a composition in terms of mole ratios within the following ranges:

| | |
|---|---|
| $OH^-/SiO_2$ | 0.07–1.0 |
| $R_4N^+/(R_4N^+ + Na^+)$ | 0.2–0.95 |
| $H_2O/OH^-$ | 10–300 |
| $SiO_2/Al_2O_3$ | 500–∞ |
| $SiO_2/B_2O_3$ | 4–300 | wherein R is selected from hydrogen and at least one organic aliphatic moiety selected from the group consisting of those containing from 2 to 10 carbon atoms, and heating said reaction mixture to a temperature of from about 90° to about 200° C. for a period of time of from about 6 hours to about 120 days.

10. The method of claim 8, wherein said boron-containing crystalline material has a composition as crystallized in synthesis step (1) in terms of mole ratios of oxides on an anhydrous basis as follows:

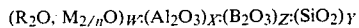

$(R_2O, M_{2/n}O)_W:(Al_2O_3)_X:(B_2O_3)_Z:(SiO_2)_Y$ wherein W/(X+Z) is from greater than about 0.5 to less than about 3; Y/(X+Z) is greater than about 20; Z/(X+Z) is from about 0.6 to about 1.0; R is a nitrogen-containing cation provided by a primary amine containing from 2 to 10 carbon atoms or a tetraalkylammonium compound in which alkyl contains from 2 to 5 carbon atoms; M is a metal from Group IA of the Periodic Table of the Elements, ammonium, hydrogen, or mixtures thereof, and n is the valence of M.

11. The method of claim 8, wherein said oxygen- and water-free environment in said calcining step (3) comprises anhydrous ammonia.

12. The method of claim 8, wherein said pH in said ion-exchange solution contacting step (4) is from about 9 to about 11.

13. The method of claim 8, wherein said inorganic oxide of said compositing step (5) is alumina.

14. A method for preparing a catalyst composition for processing high nitrogen containing oils comprising a boron-containing crystalline meterial having the structrue of zeolite ZSM-12, which comprises the sequential steps of synthesizing a boron-containing crystalline material having the structure of zeolite ZSM-12; drying said crystalline material at a temperature of from about ambient to less than about 170° C.; calcining said dried crystalline material in an oxygen- and water-free environment of anhydrous ammonia anhydrous nitrogen, other anhydrous inert gases, or a mixture thereof, at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

15. In a method for preparing a catalyst composition for processing high nitrogen containing oils comprising a boron-containing crystalline material having the structure of zeolite ZSM-12, which comprises the steps of (1) synthesizing a boron-containing crystalline material having the structure of zeolite ZSM-12; (2) drying said crystalline material at a temperature of from about ambient to less than about 170° C.; (3) calcining said dried drystalline material at a temperature of from 200° to about 600° C. and adsorbing ammonia on said calcined crystalline material; (4) contacting said crystalline material with an ion-exchange solution at a pH of from above about 7 to about 11; (5) compositing said ion-exchange solution contacted crystalline material with an inorganic oxide material; (6) drying said composite at a temperature of from about ambient to less than about 170° C.; and (7) calcining said dried composite at a temperature of from about 200° to about 600° C., the improvement which comprises conducting said steps in sequential order, and maintaining said calcining step (3) in an oxygen- and water-free environment of anhydrous ammonia, anhydrous nitrogen, other anhydrous inert gases, or a mixture thereof, to minimize hydrolysis of boron in the boron-containing crystalline material.

16. A method for preparing a catalyst composition for processing shale oil consisting essentially of a boron-containing crystalline material having the structure of zeolite ZSM-5, said structure defined in U.S. Pat. No. 3,702,886, which comprises the sequential steps of synthesizing a boron-containing crystalline material having the structure of zeolite ZSM-5; drying said crystalline material at a temperature of from about ambient to less than 170° C.; calcining said dried crystalline material in an oxygen- and water-free environment of anhydrous ammonia at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

17. A method for preparing a catalyst composition for processing shale oil consisting essentially of a boron-containing crystalline material having the structure of zeolite ZSM-5, said structure defined in U.S. Pat. No. 3,702,886, which comprises the sequential steps of synthesizing a boron-containing crystalline material having the structure of zeolite ZSM-5; drying said crystalline material at a temperature of from about ambient to less than about 170° C.; calcining said dried crystalline material in an oxygen- and water-free environment of anhydrous nitrogen at a temperature of from about 200° to about 600° C. to minimize hydrolysis of boron in the boron-containing crystalline material; adsorbing ammonia on said calcined crystalline material; contacting said crystalline material with an ion-exchange solution at a pH of from above about 7 to about 11; compositing said ion-exchange solution contacted crystalline material with an inorganic oxide material; drying said composite at a temperature of from about ambient to less than about 170° C. and calcining said dried composite at a temperature of from about 200° to about 600° C.

18. A method for preparing a catalyst composition for processing high nitrogen-containing oils comprising a boron-containing crystalline material having the structure of zeolite ZSM-5, ZSM-11, ZSM-12, Beta or Nu-1, which comprises the sequential steps of synthesizing a boron-containing crystalline material having the structure of zeolite ZSM-5, ZSM-11, ZSM-12, Beta or Nu-1; drying said crystalline material at a temperature of from about ambient to less than about 170° C.; calcining said dried crystalline material in an oxygen- and water-free environment of anhydrous ammonia, anhydrous nitrogen, other anhydrous inert gases or a mixture thereof at a temperature of from about 200° to about 600° C. to minimize hydrolysis of boron in the born-containing crystalline material; adsorbing ammonia on said calcined crystalline material; contacting said crystalline material with an ion-exchange solution at a pH of from above about 7 to about 11; drying said ion-exchanged material at a temperature of from about ambient to less than about 170° C. and calcining said dried ion-exchanged material at a temperature of from about 200° to about 200° C.

19. The method of claim 18, wherein said crystalline material is composited with an inorganic oxide material.

20. The method of claim 19, wherein said inorganic oxide material is silica, silica-zirconia, silica-magnesia or silica-titania.

21. The method of claim 18, wherein the boron-containing crystalline material synthesis step comprises forming a reaction mixture having a composition, in terms of mole ratios, falling within the following ranges:

| | |
|---|---|
| $OH^-/SiO_2$ | 0.07–1.0 |
| $R_4N^+/(R_4N^+ + Na^+)$ | 0.2–0.95 |
| $H_2O/OH^-$ | 10–300 |
| $SiO_2/Al_2O_3$ | 500–∞ |
| $SiO_2/B_2O_3$ | 4–300 | wherein R is selected from hydrogen and at least one organic aliphatic moiety selected from the group consisting of those containing from 2 to 10 carbon atoms, and heating said reaction mixture to a temperature of from about 90° to about 200° C. for a period of time of from about 6 hours to about 120 days.

22. The method of claim 18, wherein said boron-containing crystalline material has a composition as crystallized in terms of mole ratios of oxides on a anhydrous basis as follows:

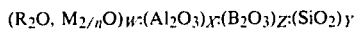

wherein W/(X+Z) is from greater than about 0.5 to less than about 3; Y/(X+Z) is greater than about 20; Z/(X+Z) is from about 0.6 to about 1.0; R is a nitrogen-containing cation provided by a primary amine containing from 2 to 10 carbon atoms or a tetraalkylammonium compound in which alkyl contains from 2 to 5 carbon atoms; M is a metal from Group IA of the Periodic Table of the Elements, ammonium, hydrogen, or mixtures thereof, and n is the valence of M.

23. The method of claim 18, wherein said pH in said ion-exchange solution contacting step is from about 9 to about 11.

24. The method of claim 21, wherein $R_4N^+$ is a cation of a tetraalkylammonium compound in which alkyl contains from 2 to 5 carbon atoms.

25. The method of claim 24, wherein $R_4N^+$ is a cation of a tetrapropylammonium compound.

* * * * *